United States Patent
Smeja et al.

(10) Patent No.: US 10,056,766 B2
(45) Date of Patent: Aug. 21, 2018

(54) SYSTEM FOR CHARGING MULTIPLE DEVICES

(71) Applicant: Limitless Innovations, Inc., McHenry, IL (US)

(72) Inventors: Michael V. Smeja, Inverness, IL (US); Kevin Satula, Milwaukee, WI (US); James J. Spangler, Elgin, IL (US)

(73) Assignee: Limitless Innovations, Inc., McHenry, IL (US)

( * ) Notice: Subject to any disclaimer, the term of this patent is extended or adjusted under 35 U.S.C. 154(b) by 459 days.

(21) Appl. No.: 14/591,818

(22) Filed: Jan. 7, 2015

(65) Prior Publication Data
US 2015/0194829 A1    Jul. 9, 2015

Related U.S. Application Data

(60) Provisional application No. 61/924,484, filed on Jan. 7, 2014.

(51) Int. Cl.
*H02J 7/00* (2006.01)

(52) U.S. Cl.
CPC .......... *H02J 7/0026* (2013.01); *H02J 7/0021* (2013.01); *H02J 7/0027* (2013.01); *H02J 7/0042* (2013.01)

(58) Field of Classification Search
CPC .................................................... H02J 7/0042
USPC ........................................................ 320/107
See application file for complete search history.

(56) References Cited

U.S. PATENT DOCUMENTS

| | | | | |
|---|---|---|---|---|
| 5,914,585 | A * | 6/1999 | Grabon | G06F 1/163 307/29 |
| 2008/0297112 | A1* | 12/2008 | Cordes | H02J 7/0073 320/128 |
| 2009/0267562 | A1* | 10/2009 | Guccione | H02J 7/0054 320/114 |
| 2010/0176762 | A1* | 7/2010 | Daymude | H02J 7/0044 320/115 |
| 2012/0306434 | A1* | 12/2012 | Sassen | H02J 7/0027 320/107 |

* cited by examiner

*Primary Examiner* — Yalkew Fantu
(74) *Attorney, Agent, or Firm* — Reed Smith LLP

(57) ABSTRACT

A system. The system includes a housing, an input port, a plurality of connection ports and circuitry. The input port is surrounded by the housing. The plurality of connection ports are surrounded by the housing. The circuitry is positioned within the housing and is electrically connected to the input port and each of the plurality of connection ports. The circuitry is configured to, for each connection port, supply about 5 volts of electric potential to the connection port, supply optimal amperes of current to an electrical device connected to the connection port, and provide protection from at least one fault condition. The optimal amperes of current is specific to the electrical device.

21 Claims, 13 Drawing Sheets

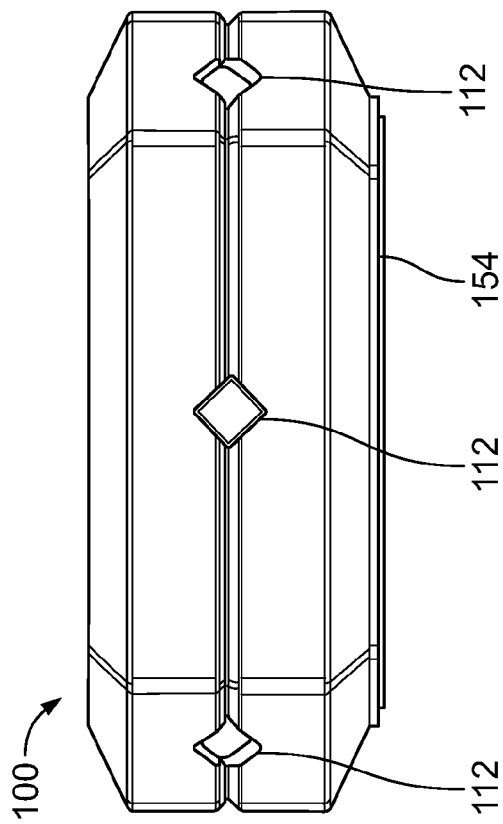
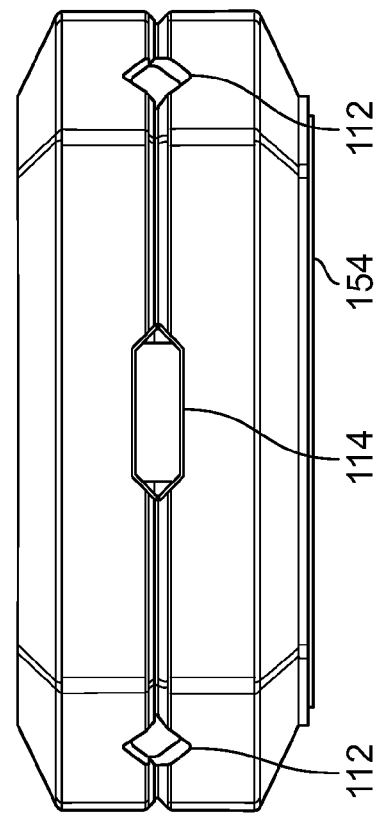

SYSTEM FOR CHARGING MULTIPLE DEVICES

CROSS-REFERENCE TO RELATED APPLICATION

This application claims the benefit under 35 U.S.C. § 119(e) of the earlier filing date of U.S. Provisional Patent Application No. 61/924,484 filed on Jan. 7, 2014, the contents of which are hereby incorporated by reference in their entirety.

BACKGROUND

This application discloses an invention which is related, generally and in various embodiments, to a system for charging multiple devices.

In today's world, the average person may operate, and/or carry, several electronic devices throughout a typical day, such as, for example, a mobile telephone, a personal digital assistant (PDA), a personal computer (e.g., a laptop, a tablet, an electronic reader, etc.), a digital camera, a wireless headset, an audio listening device (e.g., headphones), a personal media player (e.g., MP3 player, dedicated music player, etc.), a hand-held gaming device, etc. Many electronic devices require a power cord for charging a rechargeable battery included therein, and some require a cable for connecting the device to a computer and sharing information therewith. Unfortunately, too many of these electronic devices require unique cords or cables that have no universal alternative. In addition to power and data cables, electronic devices that have Internet capability may require an Ethernet cable for connecting to an Ethernet port. Trying to manage these various cords and cables can be a particularly cumbersome task, especially when multiple electronic devices are being operated in a given space. Further, due to the unavailability of universal charging cables for many of these devices, trying to keep track of the different cables and having to carry multiple cables when on-the-go can also be burdensome.

BRIEF DESCRIPTION OF THE DRAWINGS

Various embodiments of the invention are described herein in by way of example in conjunction with the following figures, wherein like reference characters designate the same or similar elements.

FIG. 1B illustrates a side view of the multi-cable management system of FIG. 1 according to various embodiments;

FIG. 1C illustrates another side view of the multi-cable management system of FIG. 1 according to various embodiments;

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 1A:
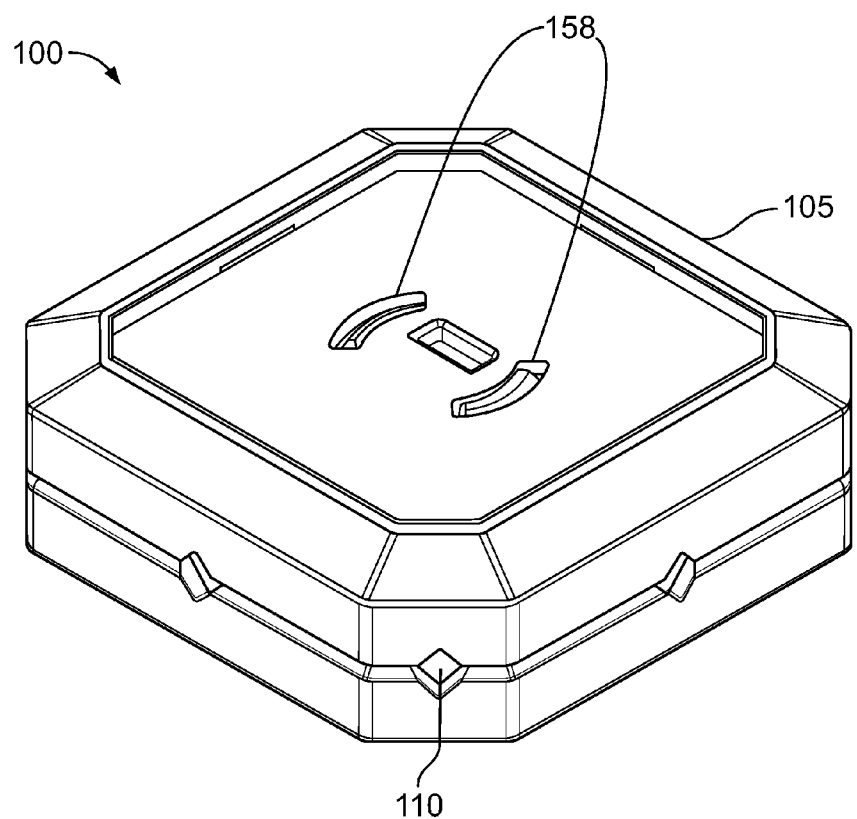
FIG. 1A illustrates a perspective view of a multi-cable management system according to various embodiments.

FIGS. 1A-1C illustrate various embodiments of a multi-cable management system 100. The system 100 includes a housing 105 which defines a plurality of openings 110 which can be utilized to manage multiple cables, cords, wires or the like. For purposes of simplicity, the cables are not shown in FIGS. 1A-1C. The types of cables that may be organized, stored, or otherwise managed by the system 100 can include, but are not limited to, power cords, data cables (e.g., Universal Serial Bus (USB) cables, etc.), audio cables (e.g., speaker wires, headphones wires, etc.), video cables, audio-visual cables, Internet cables (e.g., Ethernet cables, telephone cords, etc.) and any other cable that may be required by an electronic device. For each of a plurality of cables, a given cable can enter the housing 105 through one of the openings 110 and exit the housing 105 through another of the openings 110. The housing 105 may include a space or inner space 136 (See FIG. 3) for storing at least a portion of each cable passing through the housing 105, so as to minimize the amount of cable extending from the system 100. The system 100 may be placed on a desktop, a countertop, a tabletop, or any other surface where the management and organization of multiple cables associated with multiple electronic devices may be desirable. For example, the user may wish to place the system 100 near an electric socket (e.g., wall outlet, power strip, etc.) and/or an internet connection (e.g., Ethernet jack, phone jack, etc.), so that an existing end of each cable may be appropriately coupled thereto. As another example, the user may wish to place the system 100 on a surface that is large enough to accommodate the electronic devices associated with the cables being managed by the system 100.

According to various embodiments, a majority of the openings 110 can be configured as entry ports 112, as shown in FIG. 1B, for receiving cables as they enter the housing 105, and at least one of the openings 110 can be configured as an exit port 114, as shown in FIG. 1C, for receiving cables as they exit the housing 105. According to various embodiments, a given exit port 114 may be larger than the respective entry ports 112, so that all the cables entering the housing 105 through various entry ports 112 may fit through the given exit port 114. For example, according to various embodiments, the exit port 114 may be dimensioned to receive up to seven cables at a time, while the entry ports 112 may be dimensioned to receive one cable at a time. Although only one entry port 114 is shown in FIG. 1C, it will ( be appreciated that the system 100 may include any number of exit ports 114.

In FIGS. 1B and 1C, the entry ports 112 are shown as being similar in size and having a square-like shape that is rotated (e.g., 45 degrees) onto its side, and the exit port 114 shown in FIG. 1C is shown as having a hexagon-like shape that has been elongated in order to receive multiple cables. Although the openings 110, the entry ports 112 and the exit port 114 are shown in FIGS. 1A-1C as having certain sizes, shapes and orientations, it will be appreciated, the openings 110, the entry ports 112 and the exit port 114 are not limited to the illustrated sizes, shapes and orientations, and may be of any suitable size, shape and orientation. For example, according to various embodiments, one or more of the openings may be polygonal-shaped. According to other embodiments, one or more of the openings 110 may have rounded or circular shapes, as shown by circular openings 210 in FIG. 5. According to various embodiments, the entry ports 112 may have a circular shape, and the exit port 114 may have an oval or ovoid shape.

According to various embodiments, the size and/or shape of the openings 110 can be selected based on the dimension(s) of one or more commercially available cables, such as, for example, an average USB cable, an average Ethernet cable, an average power cord for a laptop computer, etc. In yet other embodiments, the entry ports 112 can be configured to have several different sizes and/or shapes to accommodate various types of cables, thereby enabling the system 100 to be used for managing cables associated with a greater variety of electronic devices. For example, according to various embodiments (not shown for purposes of simplicity), a first entry port 112 may be sized and/or shaped to receive a thin, rounded cable (e.g., a headphone wire), a second entry port 112 may be sized and/or shaped to receive a flat or rectangular-shaped cable (e.g., a video camera cable), a third entry port 112 may be sized and/or shaped to receive a thick, rounded cable (e.g., an Ethernet cable), a fourth entry port 112 may be sized and/or shaped to receive a medium-sized, rounded cable (e.g., a power cord), and so on.

It will be appreciated that though FIGS. 1A-1C illustrate the openings 110 in certain configurations, the principles disclosed herein are not limited to the exact number, size, and/or type of openings 110 shown in the illustrated embodiments. For example, in the embodiments shown in FIGS. 1A-1C, the housing 105 is understood to define eight openings 110. However, the system 100 can be configured to include any number of openings 110 and is not limited by the illustrations. As another example, in some embodiments, at least some of the openings 110 can be designated as entry/exit ports that can be used for receiving either entering cables or exiting cables (not shown for purposes of simplicity). For example, some electronic devices may need to be coupled to each other, rather than to a wall outlet. In other embodiments, the openings 110 may not be specifically designated as entry and/or exit ports and may be used for either purpose to suit the user's cable organization needs.

Figure 2:
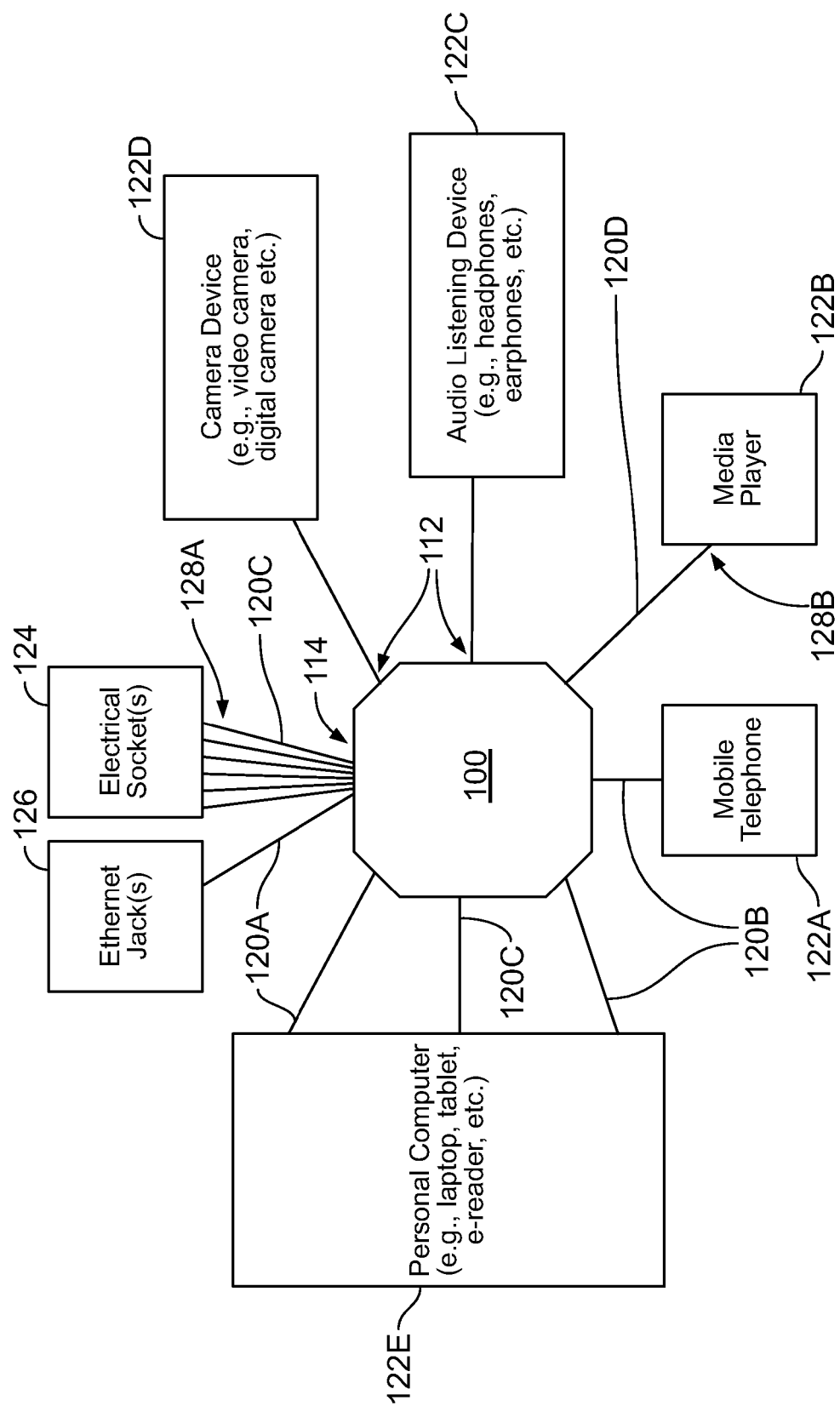
FIG. 2 illustrates multiple devices connected to various embodiments of the multi-cable management system of FIG. 1.

FIG. 2 illustrates multiple devices 122 connected to the multi-cable management system 100. As shown in FIG. 2, cables (e.g., 120A-120C, etc.) connected to a plurality of electronic devices (e.g., 122A-122E) are received by the system 100, pass within the space 136 and exit the system 100 towards one or more electrical sockets 124, communication ports 126, or other electronic devices 122. For the embodiments shown in FIG. 2, the openings 110 defined by the housing 105 are radially arranged so that, upon placement into the system 100, the cables 120 may radiate from the system 100 without overlapping with each other (e.g., in a "hub and spoke" type configuration). In addition to organizing the cables 120, placing the openings 110 in a radial arrangement around the housing 105 may also improve the stability of the system 100, For example, a tension may be created in the cables 120 when each end of the cable 120 is coupled to one of the electronic devices 122, sockets 124, and/or ports 126. By virtue of placing the openings 110 in a radial arrangement around the housing 105, this cable tension can be evenly distributed around the housing 105 and thereby, hold the system 100 in a relatively stationary position on a substantially level surface.

Figure 3:
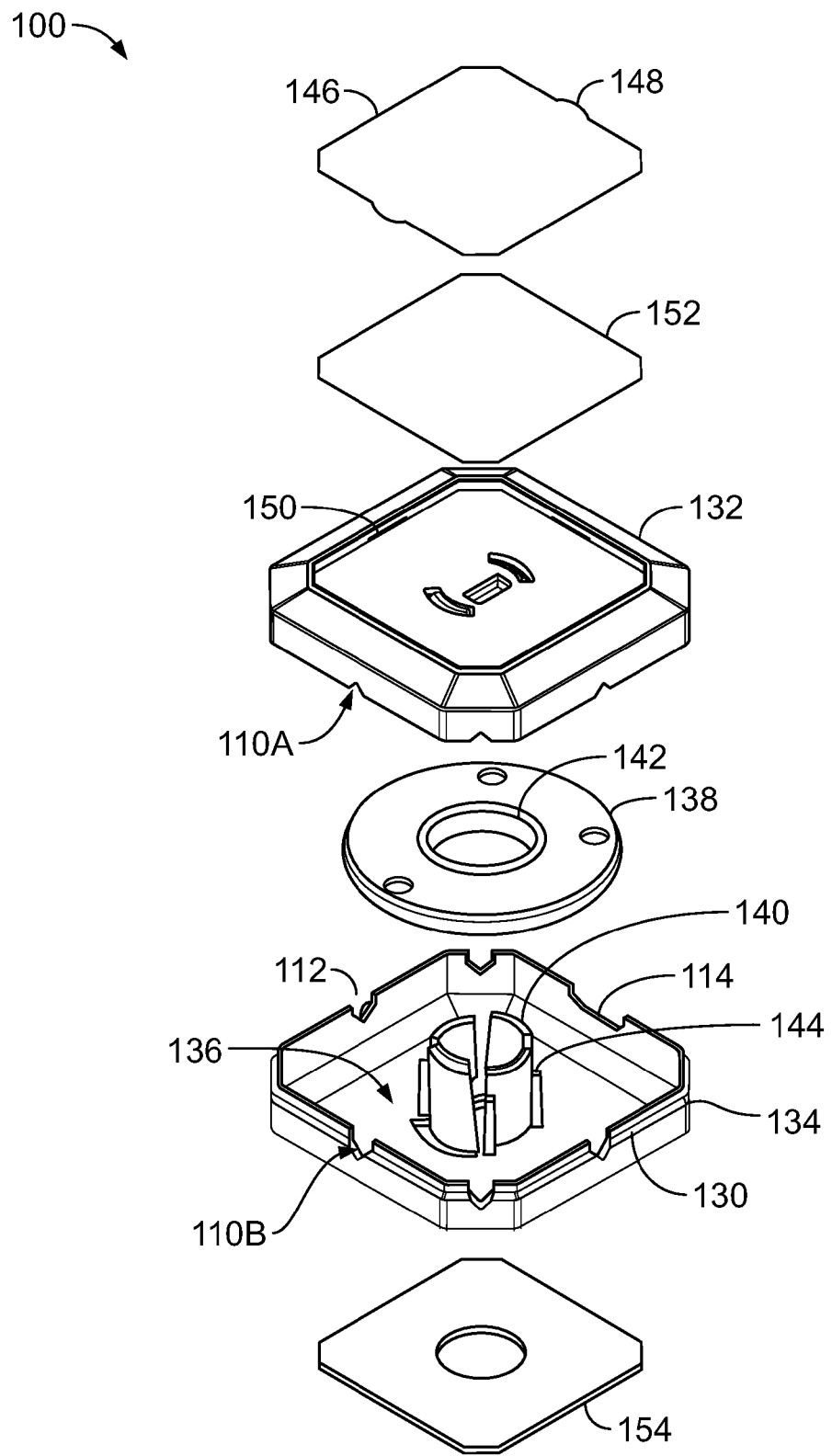
FIG. 3 illustrates an exploded view of the multi-cable management system of FIG. 1 according to various embodiments.

According to various embodiments, the system 100 can be utilized to organize the plurality of cables 120 by inserting a first end 128 A of each of the cables 120 into a respective entry port 112, guiding the first end 128A through the inside of the housing 105 and out of the exit port 114, and plugging the first end 128A into a respective socket 124 or port 126 (all of which can be done while a "top" portion of the housing 105 is separated from a "bottom" portion of the housing 105 as described in more detail hereinbelow with respect to FIG. 3). A second end 128B of each of the cables 120 can remain extended from a respective entry port 112 so as to be accessible to the user when, for example, the user wishes to couple one of the electronic devices 122 to a corresponding cable 120, According to various embodiments, the above-described radial arrangement can be achieved by spacing the openings 110 equidistantly apart around the housing 105. According to other embodiments, each of the openings 110 can be aligned with an axis passing through a center of the housing 105, For example, for the embodiments shown in FIG. 2, the openings 110 are aligned with one of four X-Y axes passing through the center of the housing 105 (e.g., a vertical axis, a horizontal axis, a first diagonal axis, and a second diagonal axis, opposite from the first).

In FIG. 2, the system 100 is shown as receiving cables 120 from the plurality of electronic devices 122 through the entry ports 112. in the illustrated embodiments, the electronic devices 122 being used in association with the system 100 include a mobile telephone 122A, a media player 122B (e.g., an MPS player, a DVD player, a personal media player, etc.), an audio listening device 122C (e.g., headphones, earphones, earbuds, headsets, etc.), a camera 122D (e.g., video camera, photography camera, digital multi-purpose camera, etc.), and a personal computer 122E (e.g., laptop, tablet, e-reader, etc.), A multitude of other personal electronic devices 122 may be used in connection with the system 100, including, but not limited to, a personal digital assistant (PDA), a gaming device, a wireless headset, a digital photo frame, a digital telephone system, a computer screen, a printer, an audio device (e.g., digital alarm clock, radio, stereo system, etc.), and a computer accessory (e.g., a wired mouse, a wired keyboard, etc.), As will be appreciated, some electronic devices 122 may require more than one cable 120. For example, a given electronic device 122 may require a power cord, a data cord, and/or an Ethernet cord. The system 100 can be used to organize multiple cables 120 for each electronic device 122. For example, in FIG. 2, the computer 122E has three cables 120 entering the system 100; an Ethernet cable 120A coupled to the Ethernet jack 126 for providing an Internet connection, a USB cable 320B coupled to the mobile telephone 122A for downloading data thereto/from and/or providing power thereto, and a power cord 120C coupled to the electrical socket 124 for providing power to the computer 122E.

FIG. 3 illustrates an exploded view of the multi-cable management system. 100 according to various embodiments. As described hereinabove, the system 100 includes a housing 105 which defines openings 110. In FIG. 3, the housing 105 is shown as a two-piece housing that opens at a channel 130 into a top portion or cover 132 and a bottom portion or base 134. According to various embodiments, the cover 132 and the base 134 can be substantially equal halves of the housing 105. In other embodiments, the housing 105 can divide into unequal portions when opened. For example, the base 134 may be larger than the cover 132 to provide more storage space for the cables 120 within the base 134. In some embodiments, the openings 110 may be located adjacent to the channel 130, so that when the housing 105 is opened, the openings 110 may become split into two portions along with the housing 105. For example, a top portion 110A of the openings 110 may remain with the cover 132 and a bottom portion 110B of the openings 110 may remain with the base 134 as shown in FIG. 3. While the cover 130 and the base 132 are shown as separate pieces in FIG. 3, according to other embodiments, the housing 105 can be a clamshell-type housing, where the cover 130 and the base 132 are fixedly attached by a hinge (not shown for purposes of simplicity).

As shown in FIG. 3, the system 100 can include a storage space 136 (also referred to as a central hub or an inner space) defined by inner surfaces of the housing 105 and configured for storing at least a portion of the cables 120 within the housing 105. For example, the housing 105 can be specifically dimensioned (e.g., height and diameter or width) to create sufficient storage space 136 for storing at least a portion of each of the plurality of cables 120 at a given time. In some embodiments, the storage space 136 may be capable of accommodating up to seven cables at a time. According to various embodiments, the housing 105 may be between about 1.25 and 1.30 inches tail and between about 3.4 and 3.5 inches wide. However, it will be appreciated the housing 105 can have other dimensions and capacity specifications, for example, depending on how many and what types of cables 120 will be stored within the housing 105.

According to various embodiments, the system 100 ears include a weighted member 138 positioned within the housing 105. For example, the weighted member 138 may be located within the storage space 136 of the housing 105. The weighted member 138 can have a weight that is specifically selected to maintain the system 100 in a substantially stationary position on a substantially level surface. There may be several reasons why it is important to prevent the system 100 from moving or shifting around on a surface. For example, it may be desirable to keep the system 100 in a designated location, especially when surface area is limited.

As another example, accidental movement of the system 100 may cause the cables 120 and/or any electronic devices 122 coupled thereto to shift, collide into each other, and/or become tangled. According to some embodiments, the weight of the weighted member 138 may be at least greater than a weight of the cables 120 stored within the housing 105. According to various embodiments, the weight of the weighted member 138 is approximately equal to the weight of a hockey puck (e.g., between about 5.3 ounces and about 5.8 ounces). Although the weighted member 138 is shown as having a circular shape, the system 100 is not limited to including a circular weighted member 138 and can have a weighted member 138 with any other suitable shape.

According to various embodiments, the system 100 can also include a spool 140 positioned within housing 105. While passing through the housing 105 (e.g., between an entry port 112 and an exit port 114), at least a portion of the cables 120 can be wrapped around the spool 140, so as to store the cables 120 in an organized manner and/or prevent tangling, knotting, and/or jumbling thereof According to various embodiments, the spool 140 can be substantially cylindrical with one or more sidewalls and a substantially circular cross-section. In other embodiments, the spool 140 can have a different shape, cross-section, or appearance (e.g., an elongated prism with a square or rectangular cross-section, an elliptical cylinder with an oval cross-section, etc.). As shown in FIG. 3, the spool 140 may have a height that is equal to, or slightly less than, a height of the housing 105. In various embodiments, the spool 140 may be specifically dimensioned (e.g., height and diameter or width) to accommodate up to seven cables 120 at a time within the housing 105.

The weighted member 138 can have a central aperture 142. The central aperture 142 can be shaped and sized to receive at least a portion of the spool 140 therethrough. For example, the shape of the central aperture 142 may be designed to match the cross-sectional shape of the spool 140, and/or a diameter of the central aperture 142 may be the same as, or slightly larger than, the diameter of the spool 140. The spool 140 can include tabs 144 that are radially arranged around the sidewalls of the spool 140 to support the weighted member 138 and to prevent the weighted member 138 from sliding down to the base of the spool 140. The tabs 144 also prevent the weighted member 138 from resting on, and possibly crushing, the cables 120 that may be located in the storage space 136 below the weighted member 138. The tabs 144 can allow the weighted member 138 to hover close enough to, or suspend just above, the cables 120 in the storage space 136, so as to prevent the cables 120 from shifting out of place within the housing 105.

The system 100 can also include a face plate 146 on a top surface of the cover 132 of the housing 105. The face plate 146 can have one or more tabs 148 that may be inserted into one or more slits 150 located in the top surface of the cover 132. The slit(s) 150 can be configured to create a snug fit when the tab(s) 148 are inserted therein, so as to prevent the tab(s) 148 from accidentally slipping out and to keep the face plate 146 secured to the cover 132. The face plate 146 can allow customization of the system 100 according to personal taste, with a logo (e.g., for a sports team, a company, a school, a musical group, etc.), with a photograph or other printed image, in one or more colors, and/or according to any other design.

According to various embodiments, the face plate 146 can be a transparent lens that protects a picture or other printed image 152 inserted between the face plate 146 and the top surface of the cover 132. According to such embodiments, the printed image 152 may be interchangeable with other printed images 152, thus allowing the user to change the face of the system 100 as often as desired. In various embodiments, the printed image 152 can be a standard or preset image provided by a manufacturer of the system 100 and/or a company that has commissioned the manufacture of the system 100. For example, a company may choose to place its logo on the face of the system 100. In other embodiments, the system 100 can be configured to allow a customized/personalized printed image 152 to be inserted under the face plate 146. For example, a user may print a photograph and cut it to fit under the face plate 146. In various embodiments, the user may visit a website associated with a manufacturer of the system 100 and from there, create/customize and print the image 152. In other embodiments, the face plate 146, itself, may include an image, photograph, logo, or other design.

As shown in FIG. 3, the system 100 may further include an anti-skid back plate 154 which can be included on, or attached to, a bottom surface of the housing 105 and can be configured to reduce skidding and/or slippage of the housing 105 when the system 100 is placed on a substantially level surface. For example, the anti-skid back plate 154 can be comprised of a material that provides grip to the bottom of the housing 105. in various embodiments, the back plate 154 may include rubber, foam, and/or silicone. In other embodiments, the back plate 154 may include a hook and loop fastener and a corresponding hook and loop fastener may be attached the surface on which the system 100 will rest. According to such embodiments, the system 100 can be placed on a vertical surface, such as, for example, on a wall, on a side of a computer terminal, etc.

Figure 4:
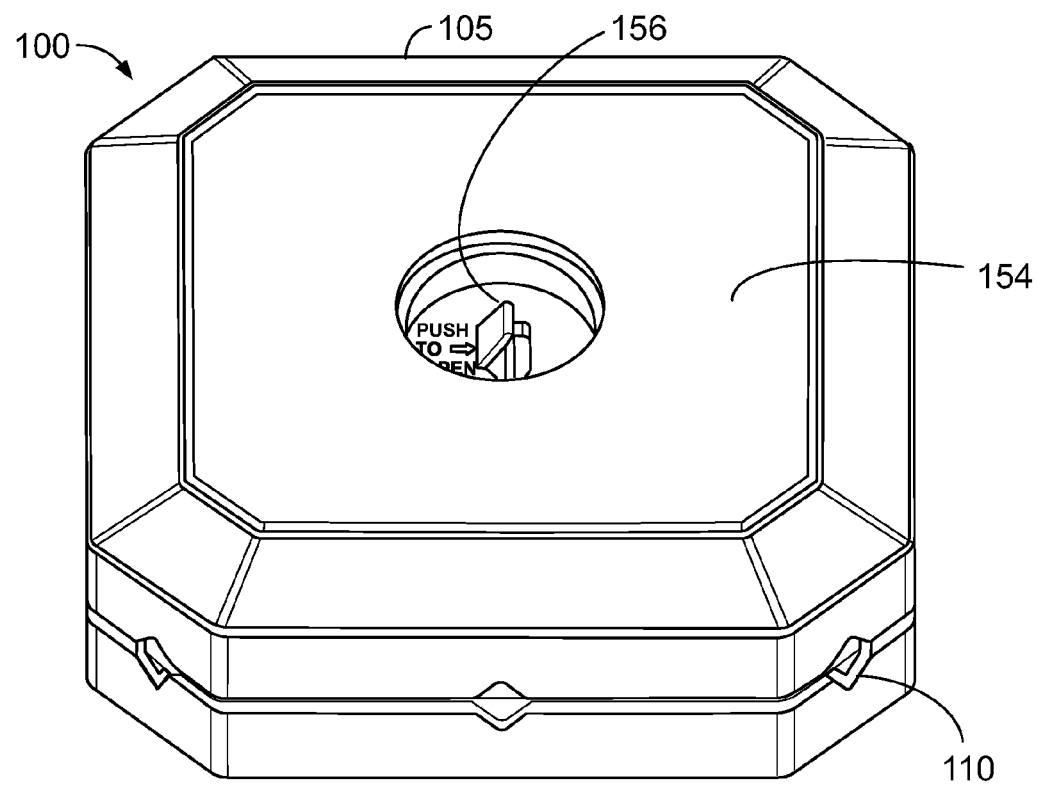
FIG. 4 illustrates a bottom view of the multi-cable management system of FIG. 1 according to various embodiments.

FIG. 4 illustrates a bottom view of the multi-cable management system 100 according to various embodiments, As shown in FIG. 4, the system 100 includes a latch 156. The latch 156 can be a portion of a spring-loaded locking mechanism (not shown for purposes of simplicity) for securely and detachably coupling the cover 132 to the base 134 in order to keep the cables 120 contained within the housing 105. In FIG. 4, the latch 156 is shown as being in a locked position. Upon moving to the locked position, the latch 156 may extend through a slot (not shown) in the base 134 and attach to a surface of the base 134. For the illustrated embodiments, the latch 16 can be unlocked by sliding or pushing the latch 156 in a predefined direction (e.g., left or right). Upon moving to the unlocked position, the latch 156 passes through the slot and becomes detached from the surface of the base 134. In various embodiments, after the housing 105 is opened, the locking mechanism is activated by aligning the edges of the cover 132 and the base 134 and pressing the two portions of the housing 105 together until the latch 156 snaps into the locked position. As illustrated in FIG. 1A, the spring-loaded locking mechanism can also include a pair of latches 158 that are visible on a top surface of the housing 105 and securely and detachably couple the base 134 to the cover 132. Like the latch 156, the pair of latches 158 snap into a locked position upon pressing the cover 132 and the base 134 together. Although FIGS. 1A and 4 show only one locking mechanism for the system 100, it will be appreciated that according to other embodiments any number of locking mechanisms may be used to detachably couple the cover 132 to the base 134.

Figure 5:
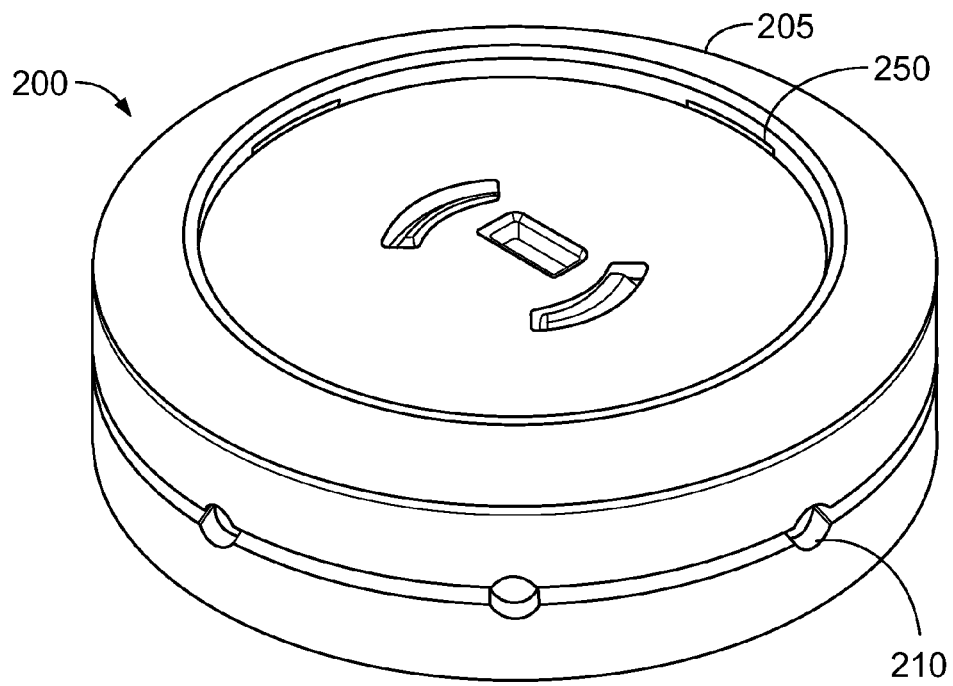
FIG. 5 illustrates a perspective view of another multi-cable management system according to various embodiments.

FIG. 5 illustrates a perspective view of another multi-cable management system 200 according to various embodiments. The system 200 is similar to the system 100, but is different in that the housing 205 has a substantially round shape. In addition to the substantially round shape shown in FIG. 5 and the square-like shape with chamfered corners shown in FIGS. 1A-1C and FIGS. 3 and 4, it will be appreciated that the housings 105, 205 may of any suitable shape. For example, according to various embodiments the housings 105, 205 may be a square shape, a rectangular shape, an oval shape, a diamond shape, a hexagonal shape, an octagonal shape, an asymmetric shape, etc.

The housings 105, 205 can include a plastic (e.g., ABS plastic) or any other light-weight, non-conductive material. The housings 105, 20 may be provided in any of a number of colors and/or have any of a number of designs printed thereon, The face plate 146 may also include a plastic. According to various embodiments, the housings 105, 205 and/or the face plate 146 can include a metal material.

In view of the above, it will be appreciated that the systems 100, 200 can be used to store and organize multiple cables 120 associated with various electronic devices 122 by, for example, passing one end of the cables 120 through respective openings 110 that are radially arranged around the housing 105 and passing an opposite end of the cables 120 through another opening 110 (e.g., exit port 114) for connection to an electric socket, a communication port, or another electronic device. In addition, the systems 100, 200 can include the weighted member 138 within the housings 105, 205 and/or the anti-skid back plate 154 on the bottom of the housings 105, 205 to prevent the systems 100, 200 from shifting out of place during use, especially when placed on a glossy or slippery surface.

According to various embodiments, the systems 100, 200 can further include a plurality of cables that may be coupled to various electronic devices. For example, the systems 100, 200 may include one or more universal phone charging cables, USB cables, headphone cables, Ethernet cables, and/or other types of cables. In some embodiments, the plurality of cables may be pre-installed within the housings 105, 205 to provide a "ready-to-use" product that may be used out of the box to couple various electronic devices to respective cables. In other embodiments, the plurality of cables may be removably coupled to the system 100, for example, as shown in FIG. 6 and discussed in more detail below.

Figure 6:
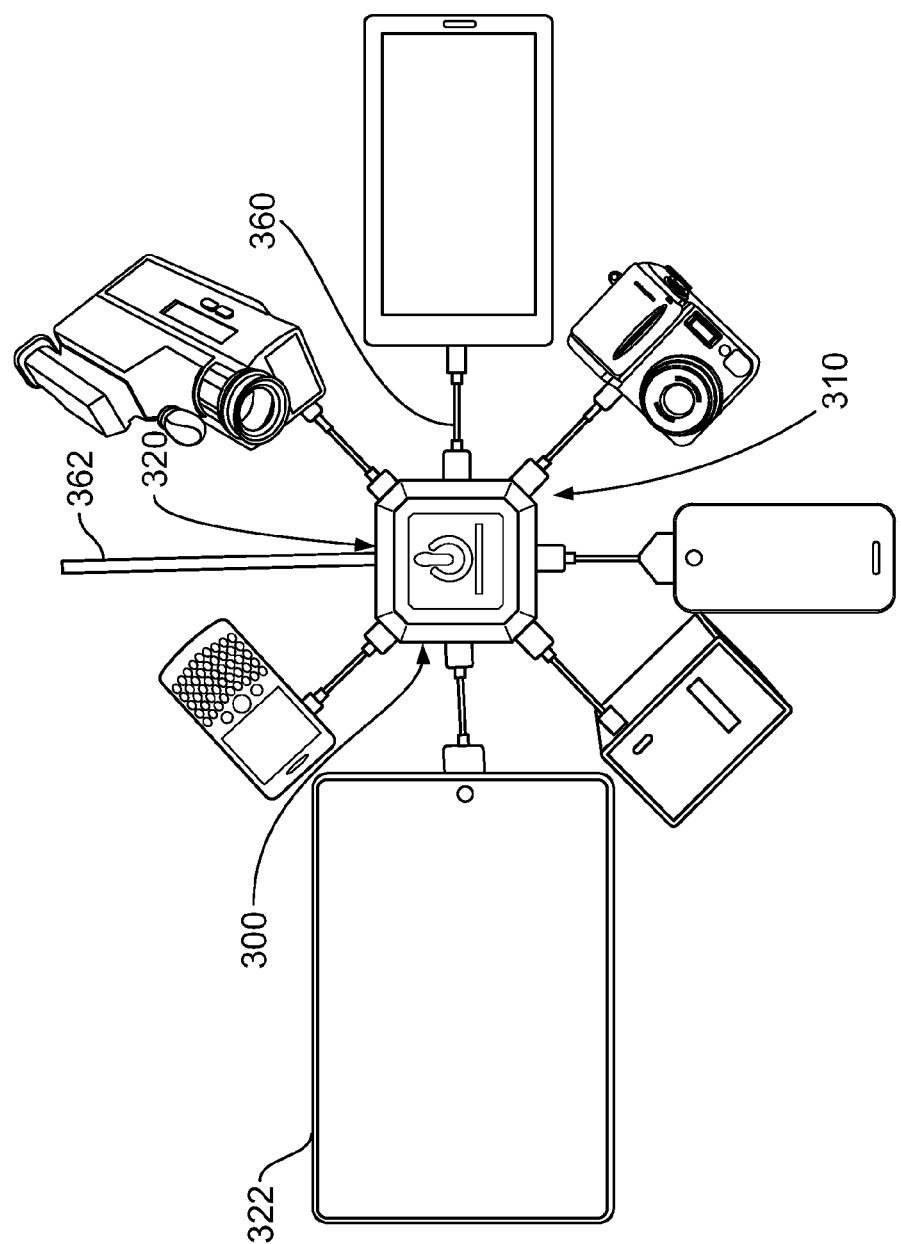
FIG. 6 illustrates a top view of multiple devices connected to various embodiments of a multi-device charging system.

FIG. 6 illustrates a top view of multiple devices connected to various embodiments of a multi-device charging system 300. The system 300 is configured to charge multiple electronic devices 322 at the same time. The electronic devices 322 may include, for example, cell phones, pagers, tablets, music players, wireless headsets, handheld gaming devices/controllers, video/digital cameras, navigation units, mobile hot spots, portable battery chargers, e-cigarettes, LED candles, hearing aids, or any other mobile device (e.g., the electric devices 122 shown in FIG. 2). The system 300 is generally similar in appearance and structure to the multi-cable management system 100 (or to the multi-cable management system 200) but is different in that the system 300 includes at least one connection port 310 and at least input port 320. As shown in FIG. 6, the system 300 may include a plurality of connection ports 310. In general, the ports 310, 320 are positioned at the same locations the openings 110 are positioned at in the system 100 (or in the system 200). Although the system 300 is shown in FIG. 6 as not including any of the openings 110, it will be appreciated that according to other embodiments, the system 300 may include any number of the openings 110.

The connection ports 310 may be configured for removable and electrical coupling to the various cables associated with the electronic devices 322, including, for example, power cords, data cables (e.g., Universal Serial Bus (USB)

cables, etc.), audio cables (e.g., speaker wires, headphones wires, etc.), video cables, audiovisual cables, Internet cables (e.g., Ethernet cables, telephone cords, etc.) and any other cable that may be required by the electronic devices 322. In some embodiments, the connection ports 310 may include different types of connectors configured tor coupling to different types of cables. In other embodiments, the connection ports 310 may include a uniform type of connector. For example, the connection ports 310 may all be female USB connectors (See FIG. 9) for receiving a male USB connector. For the embodiments shown in FIG. 6, corresponding cables having at least one male USB connector may be connected to the ports 310 in order to charge multiple electronic devices 322.

The input port 320 may be coupled to a power supply (not shown for purposes of simplicity) for providing power to the electronic devices 322 that are electrically coupled to the connection ports 310. In some cases, the power supply may be an AC power supply accessed via, for example, a wall adapter plugged into a wail outlet. In other cases, the power supply may be a DC power supply accessed via, for example, a cigarette lighter adapter plugged into a car battery. According to various embodiments, the system 300 may be configured to accept a wide range of input voltages, such as, for example, from about 9 volts (V) up to about 27 volts (V), so that a variety of external adapters may be used to power the system 300. For the embodiments shown in FIG. 6, the system 300 includes a power cable 362 for connecting the system 300 to an external power supply. In some embodiments, the input port 320 may be a female barrel connector for receiving a male end of the power cable 362. In various embodiments, the input port 320 is a barrel connector having an outer diameter of about 5.5 millimeters (mm) and an inner diameter of about 2.1 mm. The power cable 362 may be any type of power cable, including, for example, an AC adapter cable or a DC adapter cable, in some embodiments, the system 300 may include interchangeable power transformer adapters (not shown for purposes of simplicity) configured for specific international uses. For such embodiments, a given power transformer adapter may be connected to an external power source, and may be connected to the system 300 in any suitable manner (e.g., via the power cable 362).

It will be appreciated that according to various embodiments, the connection ports 310 may be electrically coupled to the power supply in such a manner as to allow the system 300 to supply different power characteristics to each of the connection ports 310 as required by each of the multiple electronic devices 322 in order to provide for optimal charging of each of the multiple electronic devices 322 attached to the connection ports 310. For example, as described in more detail hereinbelow with respect to FIG. 7, the system 300 is configured to supply a single fixed output voltage of about 5.0 volts of electric potential to each of the connection ports 310, and as described in more detail hereinbelow with respect to FIGS. 13 and 14, the system 300 is also configured to supply the optimal amperes of current to each electrical device 322 attached to the connection ports 310, even if the various electrical devices 322 require different amperes of current for optimal charging.

It will further be appreciated that according to various embodiments the connection ports 310 may be electrically coupled to the power supply in such a manner as to allow the system 300 to selectively electrically isolate an individual one of connection ports 310 in the presence of a fault in one of the multiple electronic devices 322 attached to a particular one of connection ports 310. This functionality is described in more detail hereinbelow with respect to FIGS. 13 and 14.

Additionally, it will be appreciated that according to various embodiments indicators can be associated with each of the connection ports 310 which can indicate relevant information including, but not limited to, that power is supplied, or that a fault exists. This functionality is described in more detail hereinbelow with respect to FIG. 12.

For the embodiments shown in FIG. 6, the system 300 includes seven connection ports 310 for charging up to seven electronic device 322 at once. In other embodiments, the system 300 may have any other number of connection ports 310. In some embodiments, the system 300 includes a plurality of removable cables 360 (e.g., seven cables as shown in FIG. 6), each cable being configured at one end to couple to a respective connection port 310 and configured at another end to couple to the connection port of a respective device 322. In some embodiments, the system 300 may include the plurality of removable cables 360 (the cables may be provided with the system 300). In other embodiments, the plurality of removable cables 360 may be individually selected (e.g., purchased), for example, as needed to support the devices 322 owned by a given user.

According to various embodiments, the system 300 includes one or more light-emitting diodes (LEDs) which serve to indicate that the system 300 is on and is functioning properly. The LEDs are not shown in FIG. 6 for purposes of simplicity. In some embodiments, each of the connection ports 310 may have one or more associated LED indicators to indicate whether power is being received at the connection port 310, Further, the system 300 may include one or more LED indicators at the input port 320 to indicate whether power is being received at the input port 320. In some embodiments, one or more additional LEDs emit light underneath a base (e.g., the base 134) of the system 300, so as to provide an "underglow" effect that provides ease of use in the dark. In various embodiments, the LEDs underneath the system 300 are adjustable in order to allow the user to select the brightness of the light. In some embodiments, the underglow LED may be a diffused LED, while the LED indicators at the ports 310, 320 may be clear LEDs.

According to various embodiments, the LED indicators at each of the ports 310, 320 and/or the underglow LED (or LEDs) are blue-colored lights, red-colored lights, etc. and/or combinations thereof. In other embodiments, the same one or more LED indicators may be utilized to provide the underglow effect as well as the indication that the system 300 is on and is functioning properly. It will be appreciated that according to other embodiments, a different number of LEDs can be used as power indicators and fault indicators and for aesthetic purposes. Similarly, it will be appreciated that according to other embodiments multiple colors and/or combinations of LEDs can be used in order to distinguish the various indicator and aesthetic LEDs. For example, in some embodiments, red LEDs can be used to indicate fault, while blue LEDs can be used to simultaneously indicate active power supply and serve under lighting.

Alternatively, according to various embodiments, single color LEDs (red, blue, etc.) can be used to indicate the various parameters. For example, single color LEDs can emit light continuously to indicate that the system 300 is receiving power and is functioning properly, whereas single color LEDs can be driven to emit light intermittently (e.g., blinking) to indicate a fault condition. Additionally, according to various embodiments, different color LEDs can be used to indicate the various parameters. For example, pairs of red and blue color LEDs can be driven to continuously emit red light and blue light respectively, a combination which provides a purplish light to a viewer, to indicate that the system 300 is receiving power and is functioning properly, and the pairs of red and blue LEDS cars be driven to emit red and blue light intermittently (e.g., blinking) to indicate a fault condition. Of course, it will be appreciated that any number of different LEDS can be driven in any number of different ways to realize the various indications described above. The functionality of the LEDs is described in more detail hereinbelow with respect to FIG. 12.

Figure 7:
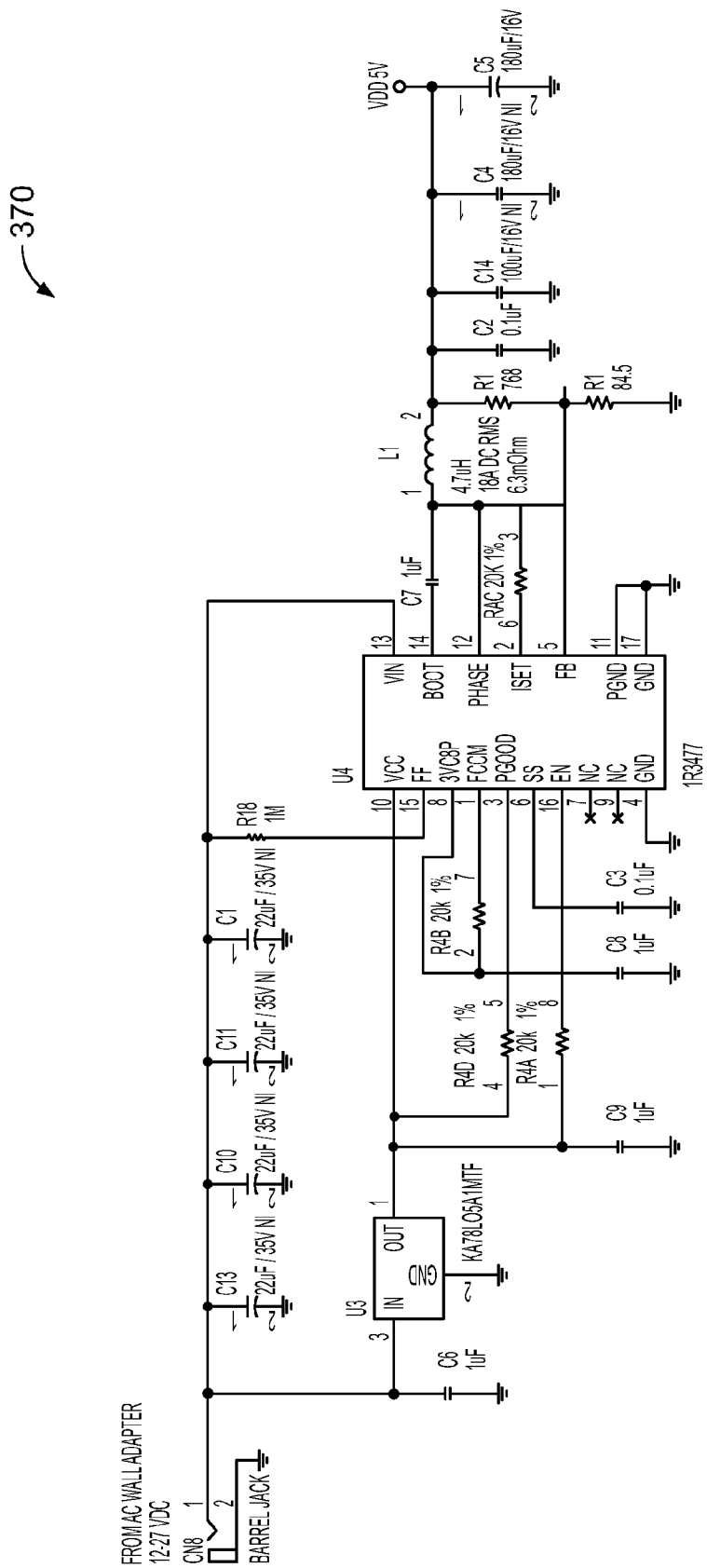
FIG. 7 illustrates various embodiments of power conversion circuitry included in the multi-device charging system of FIG. 6.

FIG. 7 illustrates various embodiments of power conversion circuitry 370 included in the multi-device charging system 300. The power conversion circuitry 370 is configured to provide the charging functionality described herein. As shown in FIG. 7, the power conversion circuitry 370 is configured to convert an input AC voltage received at the input port 320 to an output voltage of Eve volts (5 V), which is supplied at the connection ports 310 to charge the electronic devices 322 shown in FIG. 6. In various embodiments, the circuitry 370 may be configured to comply with the USB.org Battery Charging Specification, Rev. 1.1, published April 2009. It will be appreciated that the system 300 is configured to supply different amperes of current to different electrical devices 322 connected thereto based on the requirements of the respective electrical devices 322 for optimal charging. For example, the system 300 will supply about 2.4 amperes of current to a given tablet if the tablet is connected to a given connection port 310, whereas the system 300 will only supply about 2.1 amperes of current to a different tablet device if the different tablet device is connected to the connection port 310 or about 1.0 amperes of current to a given smart phone if the smart phone is connected to the given connection port 310.

According to various embodiments, as shown for example in FIG. 7, the power conversion circuitry 370 includes an internal 500 kilo-Hertz (kHz) DC-to-DC converter buck and a 5V regulator configured to step down the input voltage to the 5V output voltage. Further, the power conversion circuitry 370 may be configured to supply up to 14 amperes (A) of output current (or 70 Watts of output power) to the connected devices 322, to ensure that ail of the connected devices 322 can charge at their maximum possible speed. For example, the power conversion circuitry 370 may be configured to supply 10 Watts of output power (2 amperes of current) to enable optimal charging of certain mobile devices. As another example, the power conversion circuitry 370 may be configured to supply 12 Watts of output power (2.4 amperes of current) to enable optimal charging of other mobile devices, in various embodiments, the power conversion circuitry 370 may also have one or more electrical protection features. including, for example, short circuit protection, temperature compensated over current protection, thermal shutdown protection, voltage fault protection, and soft start. Although not shown for purposes of simplicity, it will be appreciated that the power conversion circuitry 370 may include circuitry for driving light emitting diodes.

Figure 8:
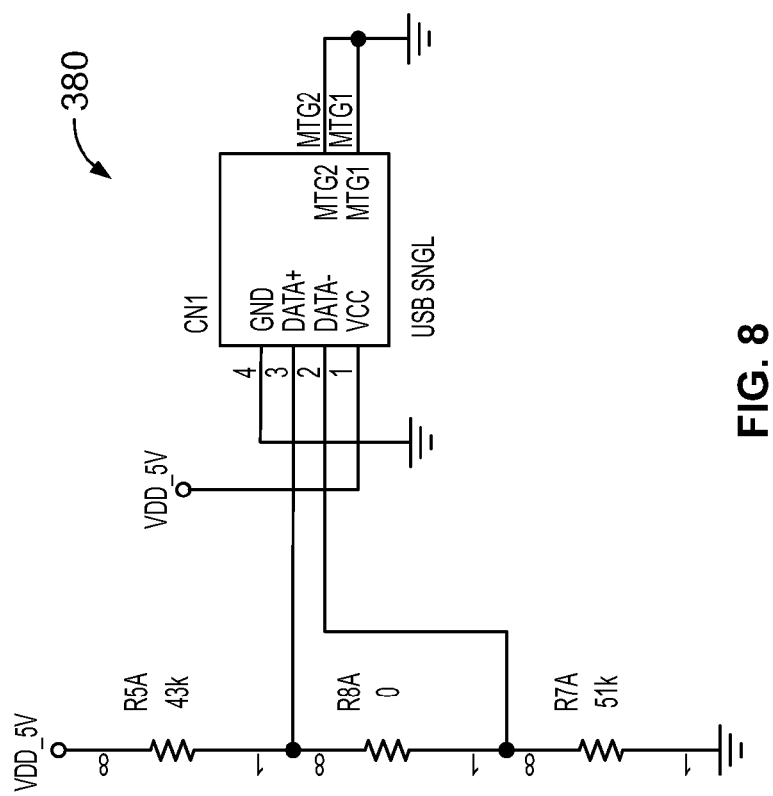
FIG. 8 illustrates various embodiments of USB connector circuitry included in the multi-device charging system of FIG. 6.

FIG. 8 illustrates various embodiments of USB connector circuitry 380 included in the multi-device charging system 300. The USB connector circuitry is configured to provide the charging functionality described hereinabove. As shown in FIG. 8, the USB connector circuitry 380 may be coupled to each of the connection ports 310 for providing a regulated 5V output voltage to the connection ports 310. In various embodiments, the circuitry 380 may be configured to comply with the USB.org Battery Charging Specification, Rev. 1.1, published April 2009.

Figure 9:
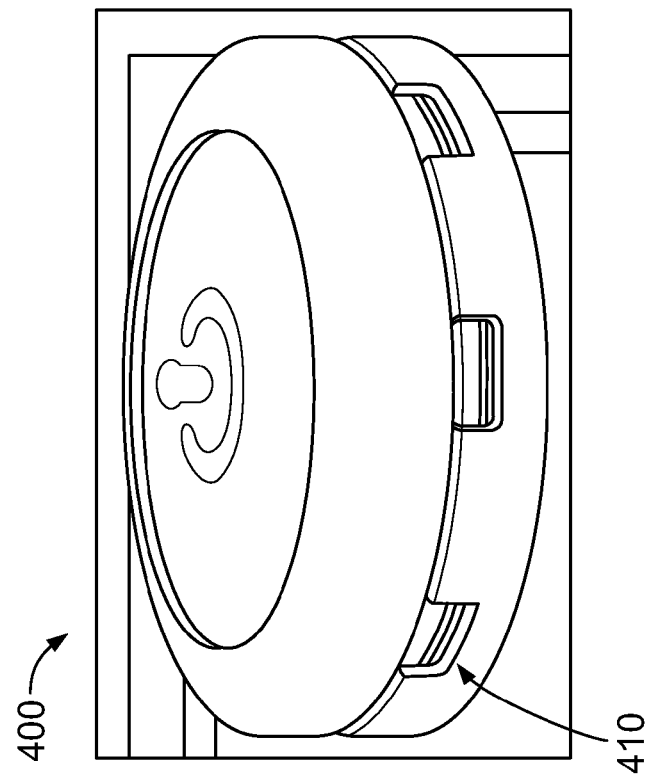
FIG. 9 illustrates a side view of another multi-device charging system according to various embodiments.

FIG. 9 illustrates a side view of another multi-device charging system 400 according to various embodiments. The system 400 is similar to the system 300, but is different in that the housing has a substantially round shape. Although only three connection ports 410 are shown in FIG. 9, it will be appreciated that the system 400 may include any number and any type of connection ports 410.

Figure 10:
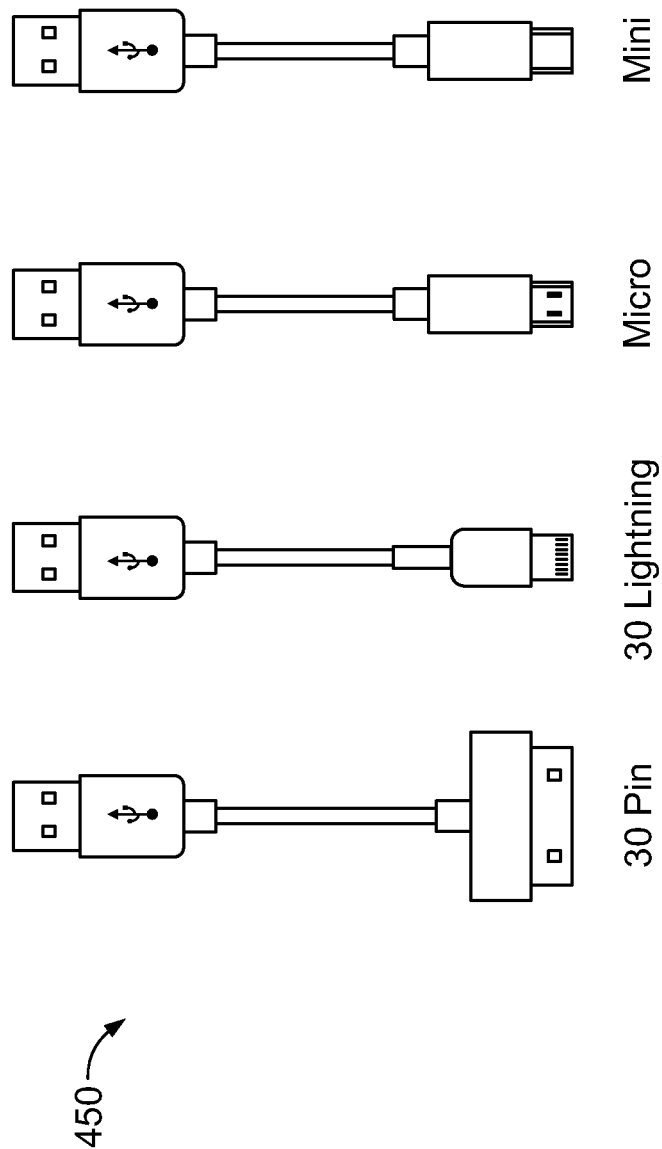
FIG. 10 illustrates exemplary cables for connecting the multi-device charging system of FIG. 9 to different electronic devices.

FIG. 10 illustrates exemplary cables 460 for connecting the multi-device charging system 400 to different electronic devices. As shown in FIG. 10, one end of the cables 460 includes a male USB connector, and another end of the cables 460 includes a male connector specifically designed for electrical connection to an electronic device (e.g., at least one of the electronic devices 322 shown in FIG. 6). For example, the "second" end of the cables 460 can include various proprietary connectors (including, e.g., a lightning connector specifically configured for certain devices, a 30-pin connector specifically configured for other devices, etc.), a standard USB connector (e.g., Type-A), a mini-USB connector, a micro-USB connector, a power plug or jack, or any other type of electrical connector. According to other embodiments, the cables 460 may be configured differently. For example, according to various embodiments, the cables 460 may be configured with female connectors on one or more ends of the cables 460.

Figure 11:
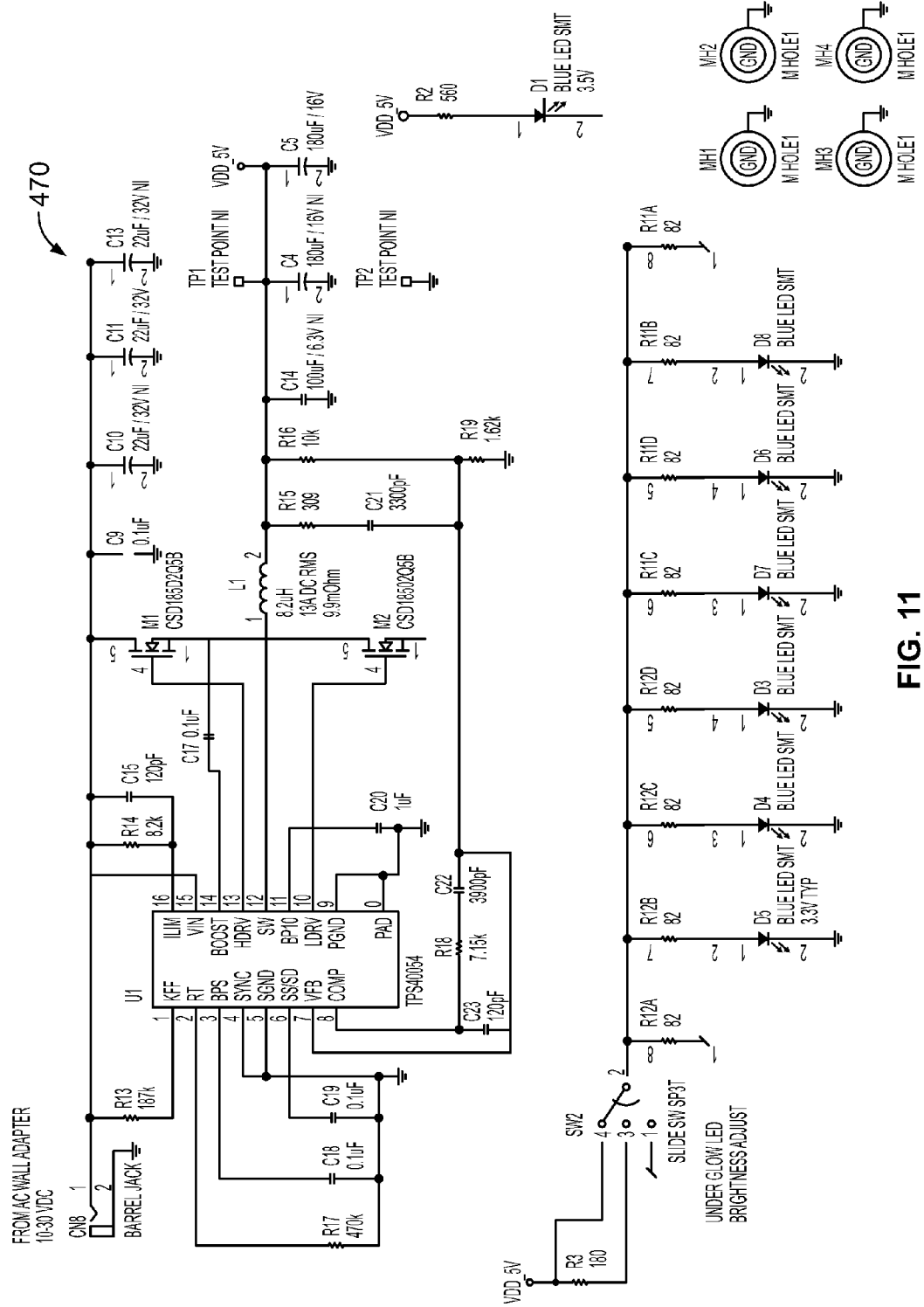
FIG. 11 illustrates various embodiments of power conversion circuitry included in the multi-device charging system of FIG. 9.

FIG. 11 illustrates various embodiments of power conversion circuitry 470 included in the multi-device charging system 400. The power conversion circuitry 470 is similar to the power conversion circuitry 370. It will be appreciated that the power conversion circuitry 470 (or other similar power conversion circuitry) can be included in the system 300 (in lieu of the power conversion circuitry 370). Similarly, it will be appreciated that the power conversion circuitry 370 (or other similar power conversion circuitry) can be included in the system 400 (in lieu of the power conversion circuitry 470). As shown in FIG. 11, the power conversion circuitry 470 includes circuitry for driving light emitting diodes.

Figure 12:
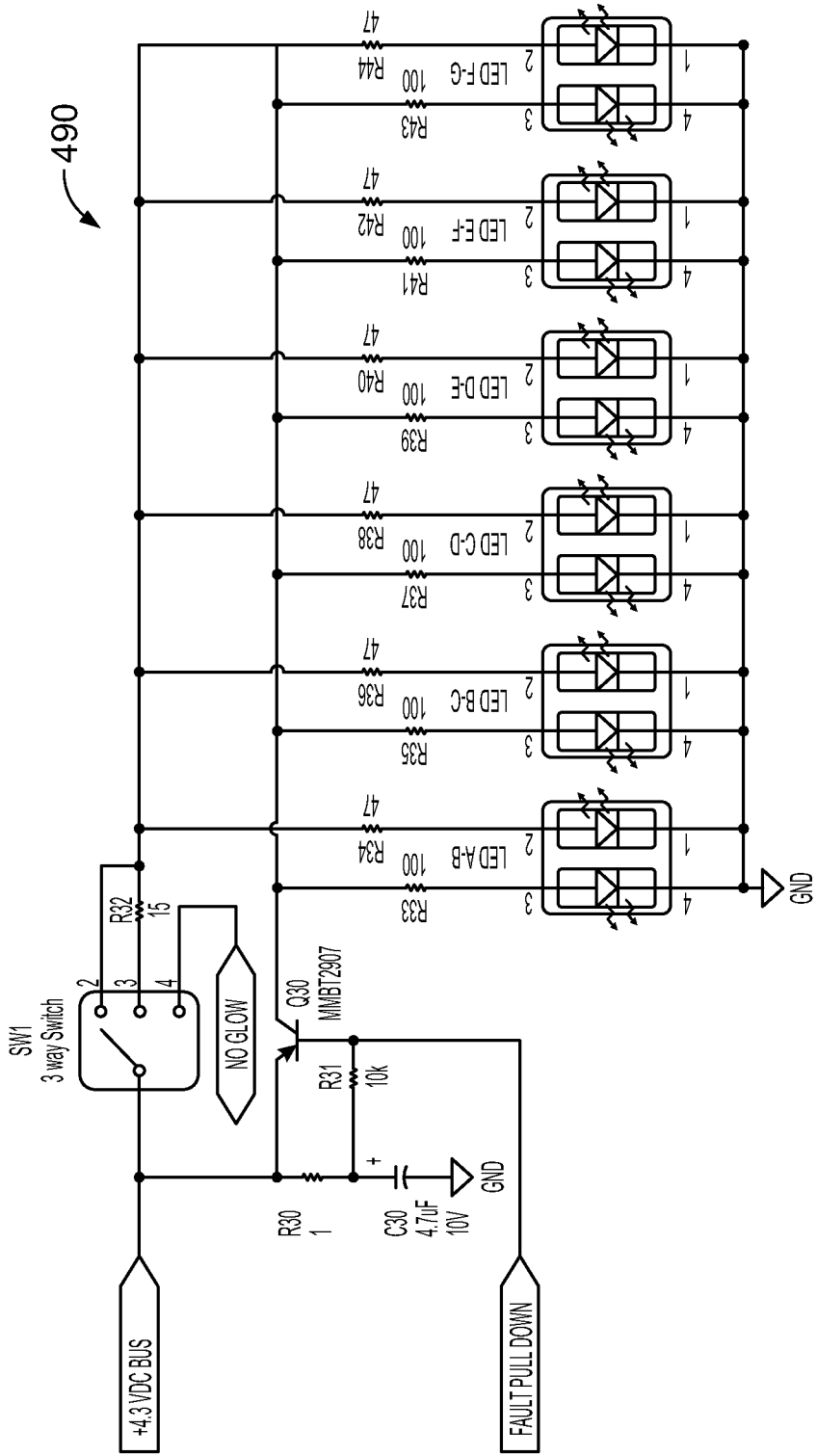
FIG. 12 illustrates various embodiments of light emitting diode driver circuitry included in the multi-device charging system of FIG. 9.

FIG. 12 illustrates various embodiments of light emitting diode driver circuitry 490 included in the multi-device charging system 400. As shown in FIG. 12, the light emitting diode driver circuitry 490 is configured to drive two different LEDs (e.g., two different color LEDs). According to various embodiments, the light emitting diode driver circuitry 490 may be incorporated into the power conversion circuitry 370 and/or the power conversion circuitry 470. The system 400 may be configured to drive the LEDs in a number of different ways to indicate any desired condition. For example, according to various embodiments, all of the "blue" LEDs (or only the "underglow blue" LED) may be driven to emit blue light when the respective components of the system 400 are operating as intended. However, if the system 400 develops a fault condition (e.g., a short-circuit, a bad printed circuit board, a bad battery in one of the electronic devices, etc.). the system 400 may operate to stop providing power to the "blue" LEDs and instead provide power to corresponding "red" LEDs to indicate the presence of a fault condition. According to various embodiments, when a fault condition is detected, the system 400 can cut power to all of the "blue" LEDs and supply power to all of the "red" LEDs.

According to other embodiments, when a fault condition is detected, the system 400 can continue to supply power to all of the "blue" LEDs associated with non-fault connection ports 310, cut power to the "blue" LED associated with a fault condition connection port 310, and supply power to the corresponding "red" LED associated with the fault condition connection port 310. Similarly, for fault conditions associated with the system 400 but not necessarily any one connection port 310, the system 400 may cut power to the "blue underglow" LED and supply power to the corresponding "red underglow" LED to indicate a system fault. It will be appreciated that the above-described functionality is not limited to "red" and "blue" LEDs but is applicable to any LED pairs (or sets of LEDS) which collectively emit two or more different colors of light.

Although not shown in the embodiments illustrated in FIG. 12, it will be appreciated that according to other embodiments, the driver circuitry 490 can be configured to drive one or more LEDs continuously or intermittently (e.g., blinking) to indicate that the system 400 is receiving power, is operating as intended, is experiencing a fault condition, etc. Additionally, although not shown in the embodiments illustrated in FIG. 12, it will be appreciated that according to other embodiments, the driver circuitry 490 can be configured to drive pairs (e.g., two LEDs) or sets (more than two LEDs) of different color LEDS continuously or intermittently to indicate that the system 400 is receiving power, is operating as intended, is experiencing a fault condition, etc.

Figure 13:
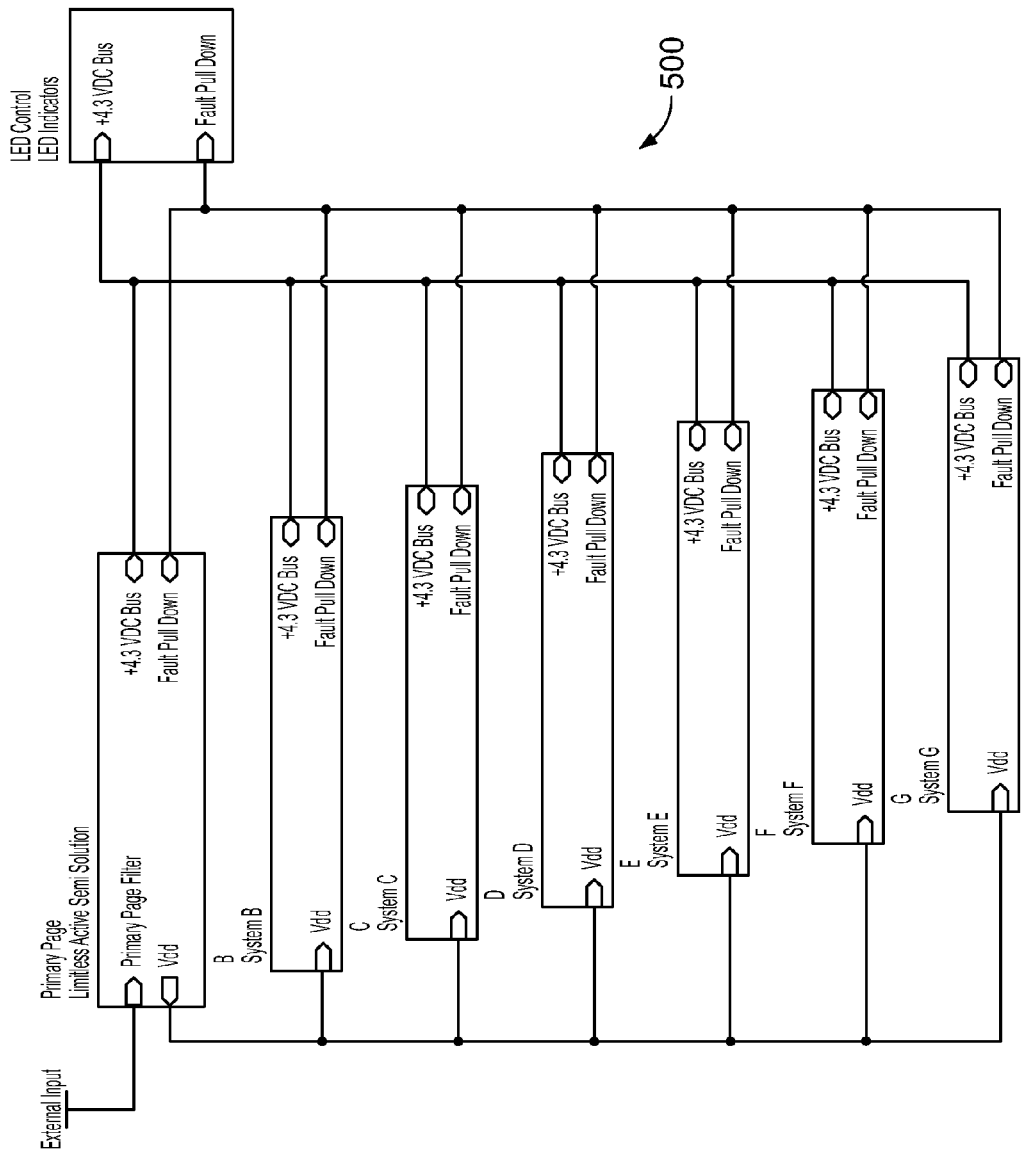
FIG. 13 illustrates a simplified representation of a multi-device charging system according to various embodiments.

FIG. 13 illustrates a simplified representation of a multi-device charging system 500 according to various embodiments. The system 500 may be similar to identical to various embodiments of the systems 300, 400. In other words, the system 500 is configured to supply different optimal amperes of current to different electrical devices 322 connected thereto based on the requirements of the respective electrical devices for optimal charging of the devices, provide individual port protection for the input port 320 and each of the connection ports 310, drive same color or different color LEDs to indicate fault/no-fault status for each of the ports 310, 320 as well as the overall system 500, etc. Various embodiments of exemplary circuitry capable of provided the above-described functionality is shown in more detail in FIG. 14.

Figure 14:
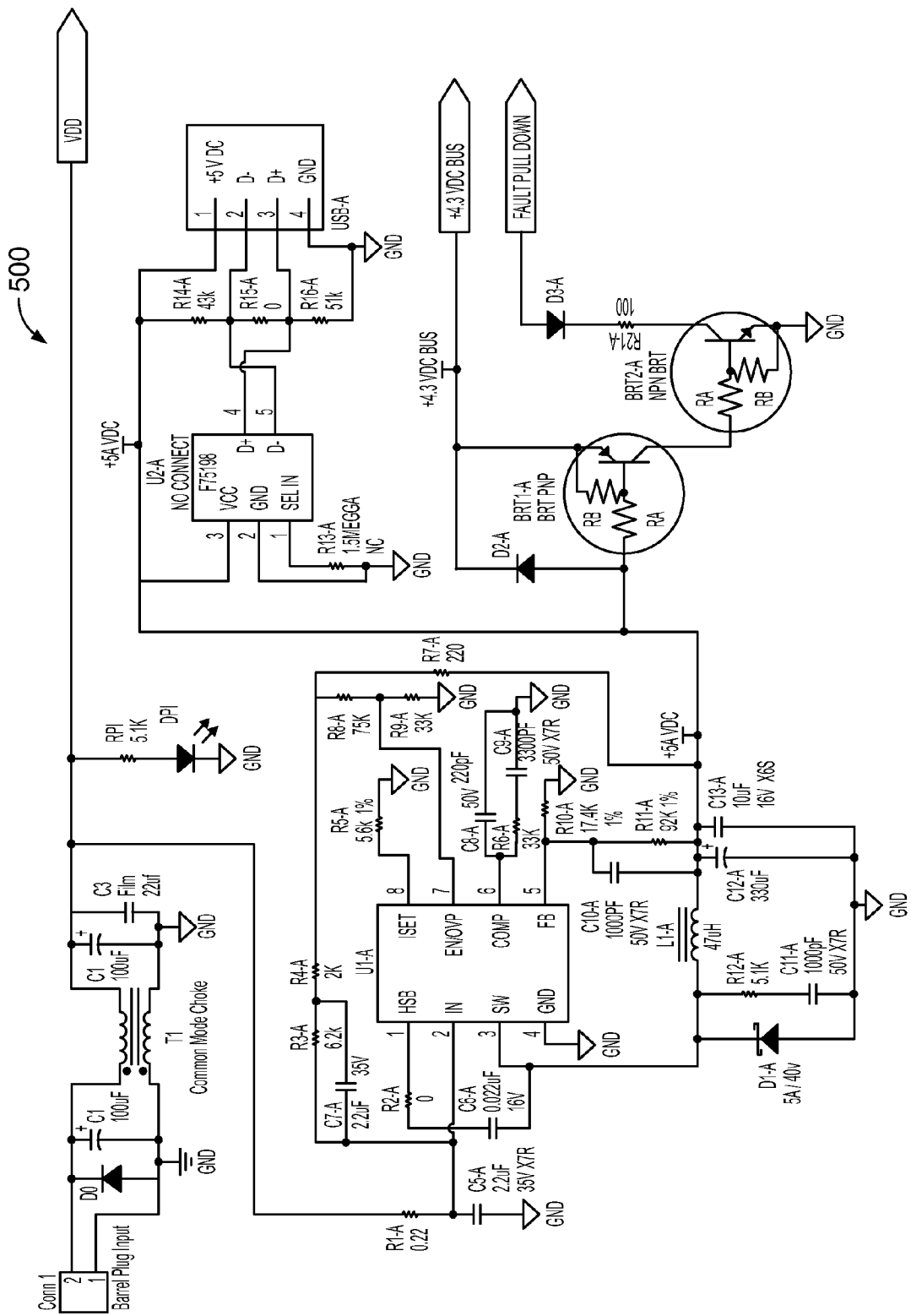
FIG. 14 illustrates various embodiments of the multi-device charging system of FIG. 13.

FIG. 14 illustrates various embodiments of the multi-device charging system 500. For purposes of simplicity, exemplary circuitry associated with only one of the connection ports 310 of the system 500 is shown in FIG. 14. However, it will be appreciated that the system 500 includes similar or identical circuitry for each of the other connection ports 310. Regarding the supply of the optimal amperes of current to an electrical device 322 connected to a given connection port 310, the exemplary circuitry shown in FIG. 14 "recognizes" the electrical device 322 connected to the connection port 310 and based on that "recognition" supplies the optimal amperes of current to charge the electrical device. For example, if a tablet device is connected to the connection port 310, the exemplary circuitry may supply about 2.4 amperes of current to the tablet device. If a smart phone is connected to die connection port 310, about 1.0 amperes of current may be supplied to the smart phone. At no time will too much current be supplied to the connected electrical device 322, thereby ensuring that the supplied current does not damage the connected electrical device 322.

Regarding the individual port protection functionality, the exemplary circuitry shown in FIG. 14 "recognizes" the existence of a fault condition associated with a given connection port 310 exists and based on that "recognition" cuts off power to the given connection port 310. Such fault conditions may include, for example, a power surge condition, an electrostatic discharge condition, an over-voltage condition, a short circuit condition, a thermal overload condition, a defect associated with the electrical device 322, etc. For example, if an electrical device 322 having a bad battery is plugged into a given connection port 310, the exemplary circuitry will "recognize" the bad battery condition and based on that "recognition" will cut off power to the given connection port 310. Once the electrical device with the bad battery is removed from the given connection port 310, the exemplary circuitry will "recognize" that the fault condition has been removed and will be ready to supply power to the connection port 310 the next time an electrical device 322 is connected thereto.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the described invention. Accordingly, it is understood that the drawings and the descriptions herein are proffered only to facilitate comprehension of the invention and should not be construed to limit the scope thereof.

What is claimed is:

1. A system, comprising: a housing; an input port surrounded by the housing; a plurality of connection ports surrounded by the housing; and circuitry positioned within the housing and electrically connected to the input port and each of the plurality of connection ports, wherein the circuitry is configured to:
   for each connection port, supply about 5 volts of electric potential to the connection port;
   for each connection port, supply optimal amperes of current to an electrical device connected to the connection port, wherein the optimal amperes of current is specific to the electrical device, and wherein the optimal amperes of current is set to an amount that allows the device to charge at its maximum charging speed; and
   for each connection port, provide protection from at least one fault condition.

2. The system of claim 1, wherein the input port is configured to receive power from an external power source.

3. The system of claim 1, wherein each connection port is configured the same.

4. The system of claim 3, wherein for each connection port, the connection port is configured to transfer power from the circuitry to an electrical device connected thereto.

5. The system of claim 1, wherein the optimal amperes of current is about 1.0 amperes of current.

6. The system of claim 1, wherein the optimal amperes of current is about 2.1 amperes of current.

7. The system of claim 1, wherein the optimal amperes of current is about 2.4 amperes of current.

8. The system of claim 1, wherein the fault condition is at least one of the following:
   a power surge condition;
   an electrostatic discharge condition;
   an over-voltage condition;
   a short circuit condition;
   a thermal overload condition; and
   a defect associated with the electrical device connected to the connection port.

9. The system of claim 1, further comprising a plurality of light emitting diodes connected to the circuitry.

10. The system of claim 9, wherein the input port is associated with at least one of the light emitting diodes.

11. The system of claim 9, wherein at least one of the plurality of connection ports is associated with at least one of the light emitting diodes.

12. The system of claim 9, wherein at least one of the plurality of connection ports is associated with at least two of the light emitting diodes.

13. The system of claim 9, wherein the circuitry is configured to drive at least one of the light emitting diodes if power is being received at the input port.

14. The system of claim 9, wherein the circuitry is configured to drive at least one of the light emitting diodes if the system is operating in the absence of the at least one fault condition.

15. The system of claim 9, wherein the circuitry is configured to drive at least two of the light emitting diodes if the system is operating in the absence of the at least one fault condition.

16. The system of claim 9, wherein the circuitry is configured to drive at least one of the light emitting diodes intermittently if the system is operating in the presence of the at least one fault condition.

17. The system of claim 9, wherein the circuitry is configured to drive at least two of the light emitting diodes intermittently if the system is operating in the presence of the at least one fault condition.

18. The system of claim 1, further comprising a power transformer adapter coupled to the circuitry.

19. The system of claim 1, further comprising a cable connected to the input port.

20. The system of claim 1, further comprising a cable connected to one of the connection ports.

21. A multi-device charging system, comprising:
a central housing including:
an input port surrounded by the housing;
a plurality of connection ports each surrounded by the housing; and
circuitry located in the central housing and electrically connected to the input port and each of the plurality of connection ports, wherein the circuitry is configured to:
supply about 5 volts of electric potential to each of the plurality of connection ports, and
supply optimal amperes of current to an electrical device connected to the connection port, wherein the optimal amperes of current is specific to the electrical device, and wherein the optimal amperes of current is set to an amount that allows the device to charge at its maximum charging speed; and
for each connection port, provide protection from at least one fault condition.

\* \* \* \* \*